(12) United States Patent
Hwang

(10) Patent No.: US 12,275,662 B2
(45) Date of Patent: Apr. 15, 2025

(54) APPARATUS AND METHOD FOR PROCESSING GLASS

(71) Applicant: Corning Incorporated, Corning, NY (US)

(72) Inventor: Jun Hyeong Hwang, Asan (KR)

(73) Assignee: CORNING INCORPORATED, Corning, NY (US)

( * ) Notice: Subject to any disclaimer, the term of this patent is extended or adjusted under 35 U.S.C. 154(b) by 424 days.

(21) Appl. No.: 17/619,482

(22) PCT Filed: Jun. 18, 2020

(86) PCT No.: PCT/US2020/038343
§ 371 (c)(1),
(2) Date: Dec. 15, 2021

(87) PCT Pub. No.: WO2021/003026
PCT Pub. Date: Jan. 7, 2021

(65) Prior Publication Data
US 2022/0306514 A1 Sep. 29, 2022

(30) Foreign Application Priority Data
Jul. 2, 2019 (KR) .................. 10-2019-0079326

(51) Int. Cl.
*C03B 35/20* (2006.01)
*B08B 1/00* (2024.01)
(Continued)

(52) U.S. Cl.
CPC .............. *C03B 35/20* (2013.01); *B08B 1/12* (2024.01); *B08B 1/20* (2024.01); *B41F 35/00* (2013.01);
(Continued)

(58) Field of Classification Search
CPC ..... B41F 35/00; B65G 49/066; B65G 49/064; C03B 35/20; B08B 1/20; B08B 1/12
See application file for complete search history.

(56) References Cited

U.S. PATENT DOCUMENTS

| 4,366,004 A | 12/1982 | Gregor et al. |
| 5,685,039 A | 11/1997 | Hamada et al. |

(Continued)

FOREIGN PATENT DOCUMENTS

| CN | 102190426 A | 9/2011 |
| CN | 205887485 U | 1/2017 |

(Continued)

OTHER PUBLICATIONS

Machine Translation of JP 2019102812-A to Tsai et al. (Year: 2018).*

(Continued)

*Primary Examiner* — Benjamin L Osterhout
(74) *Attorney, Agent, or Firm* — Matthew J. Mason

(57) ABSTRACT

A glass processing apparatus and a glass processing method are provided. The glass processing apparatus includes: a glass transportation apparatus comprising a carrier comprising a gripper configured to grip glass articles, and a conveyor configured to convey the carrier, and a cleaning apparatus comprising a cleaning head configured to clean the gripper, which contact the glass articles, and a moving unit configured to move the cleaning head. The glass processing method includes: loading glass articles to a carrier having a gripper by picking up the glass articles with the gripper such that the gripper contact the glass articles, conveying the glass articles by conveying the carrier with a conveyor, unloading the glass articles from the carrier by causing the gripper to be detached from the glass articles, and cleaning the gripper.

20 Claims, 19 Drawing Sheets

(51) Int. Cl.
  *B08B 1/02* (2006.01)
  *B08B 1/12* (2024.01)
  *B08B 1/20* (2024.01)
  *B41F 35/00* (2006.01)
  *B65G 49/06* (2006.01)
(52) U.S. Cl.
  CPC .......... *B65G 49/064* (2013.01); *B65G 49/066* (2013.01)

(56) References Cited

U.S. PATENT DOCUMENTS

| | | | |
|---|---|---|---|
| 7,325,268 | B1 | 2/2008 | Curcuri |
| 2004/0211449 | A1 | 10/2004 | Yokomoto et al. |
| 2011/0195254 | A1 | 8/2011 | Han et al. |
| 2015/0014124 | A1* | 1/2015 | Tagawa ................ B65G 17/323 198/468.2 |
| 2016/0163590 | A1* | 6/2016 | Jung .................. H01L 21/6835 438/666 |
| 2017/0049284 | A1* | 2/2017 | Wang ........................ A47L 9/02 |
| 2021/0024412 | A1 | 1/2021 | Liu et al. |

FOREIGN PATENT DOCUMENTS

| | | | | |
|---|---|---|---|---|
| JP | 2004-142294 | A | | 5/2004 |
| JP | 2010-099894 | A | | 5/2010 |
| JP | 5408807 | B2 | | 2/2014 |
| JP | 2019102812 | A | * | 6/2019 |
| KR | 10-2004-0103767 | A | | 12/2004 |
| KR | 10-0556140 | B1 | | 3/2006 |
| KR | 10-2016-0002341 | A | | 1/2016 |
| KR | 10-1803525 | B1 | | 11/2017 |
| TW | 201922601 | A | | 6/2019 |
| TW | 201925061 | A | | 7/2019 |
| WO | WO-2005077553 | A1 | * | 8/2005 .............. B05B 1/14 |
| WO | 2019/070654 | A2 | | 4/2019 |

OTHER PUBLICATIONS

Chinese Patent Application No. 202080056800.9, Office Action dated Mar. 25, 2023, 4 pages (English Translation only), Chinese Patent Office.

International Search Report and Written Opinion of the International Searching Authority; PCT/US2020/038343; dated Oct. 8, 2020; 11 pages; Korean Patent Office.

Taiwanese Patent Application No. 109120711, Office Action dated Nov. 10, 2023, 5 pages (English Translation only), Taiwanese Patent Office.

Korean Patent Application No. 10-2019-0079326, Office Action dated Nov. 15, 2024, 7 pages (English Translation only), Korean Patent Office.

* cited by examiner

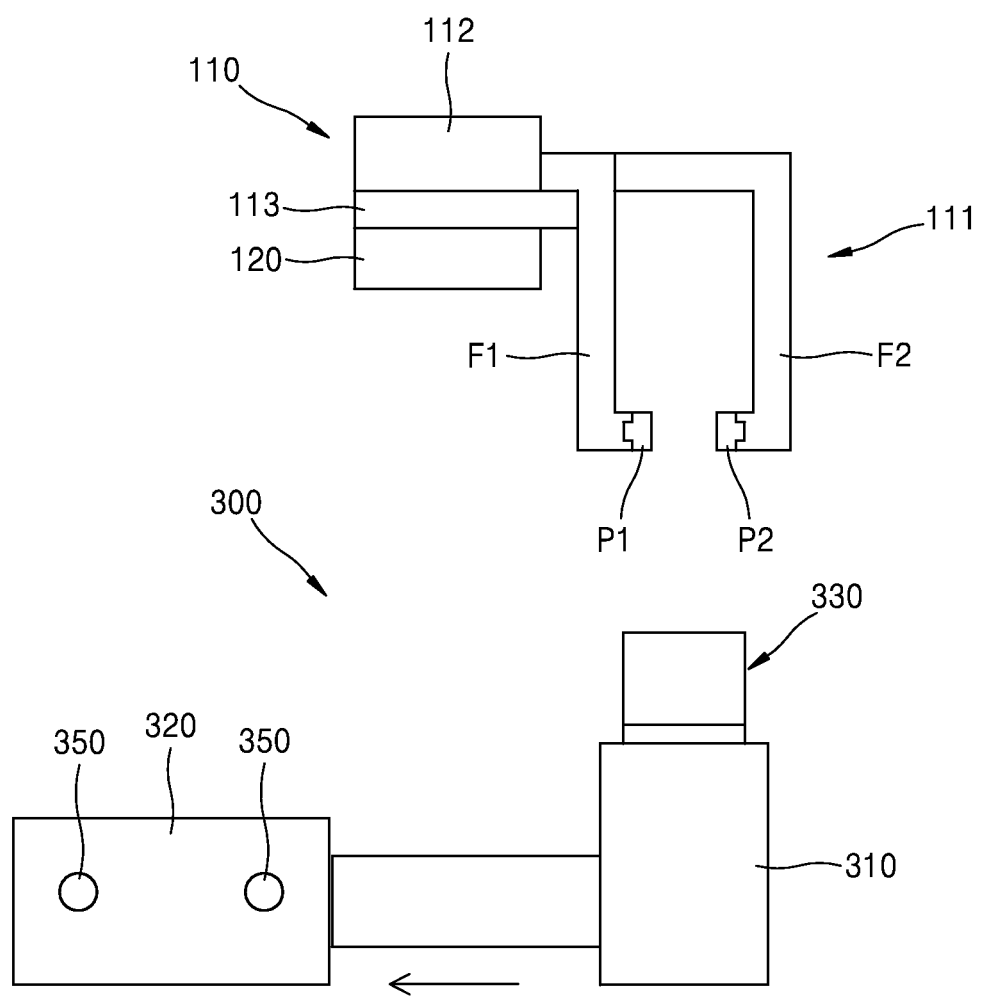

APPARATUS AND METHOD FOR PROCESSING GLASS

CROSS-REFERENCE TO RELATED APPLICATIONS

This application claims the benefit of priority under 35 U.S.C. § 371 of International Application No. PCT/US2020/038343, filed on Jun. 18, 2020, which claims the benefit of priority under 35 U.S.C. § 119 of Korean Application Serial No. 10-2019-0079326, filed on Jul. 2, 2019, the content of each of which are relied upon and incorporated herein by reference in their entirety.

FIELD

The present disclosure relates to a glass processing apparatus, and more particularly, to a glass processing apparatus including a cleaning apparatus for cleaning a gripper of a carrier. The present disclosure also relates to a glass processing method, and more particularly, to a glass processing method including cleaning a gripper of a carrier.

BACKGROUND

After a glass article is unloaded from a carrier, debris and/or particles from glass articles and/or dust from a surrounding environment may remain on a gripper of a carrier, such as on pads of fingers of the gripper. In this case, debris, particles, and/or dust may fall from the gripper, such as from the pads of the fingers of the gripper, to a processing equipment and contaminate the processing equipment. In addition, debris, particles, and/or dust remaining on the gripper, such as on the pads of the fingers of the gripper, may damage subsequent glass articles loaded to the carrier. A person may manually clean the gripper, such as the pads of the fingers of the gripper, but this requires a lot of manpower. Therefore, it is necessary to develop a glass processing apparatus including a cleaning apparatus that may automatically clean the gripper, such as the pads of the fingers of the gripper, and a glass processing method including automatically cleaning the gripper, including the pads of the fingers of the gripper.

SUMMARY

The present disclosure provides a glass processing apparatus including a cleaning apparatus for cleaning a gripper of a carrier.

According to an aspect of the present disclosure, there is provided a glass processing apparatus including: a glass transportation apparatus comprising a carrier comprising a gripper configured to grip glass articles, and a conveyor configured to convey the carrier and a cleaning apparatus comprising a cleaning head configured to clean the gripper, which contact the glass articles, and a moving unit configured to move the cleaning head.

The moving unit may include: a first moving unit configured to move the cleaning head in a vertical direction, and a second moving unit configured to move the cleaning head in a horizontal direction.

The cleaning head may comprise a brush configured to sweep the gripper.

The gripper may comprise a plurality of fingers.

The moving unit may allow the brush to pass between the plurality of fingers.

The cleaning head may include a nozzle configured to inject fluid.

The cleaning apparatus may further include a sensor configured to sense a position of the cleaning head.

The conveyor may form a loop and the carrier may be circulated by the conveyor along at least a portion of the loop.

According to another aspect of the present disclosure, there is provided a glass processing apparatus including: a conveyor extending over a loading zone, an inspection zone, a drop zone, and a processing zone; a carrier comprising a gripper configured to grip glass articles in the loading zone, the carrier being conveyed by the conveyor from the loading zone to the processing zone; a glass inspection apparatus configured to inspect the glass articles in the inspection zone and sort the glass articles into passed glass articles or failed glass articles according to a result of the inspection; a cleaning apparatus configured to clean the gripper in the drop zone after the failed glass articles are unloaded from the carrier in the drop zone; and a processing apparatus configured to process, in the processing zone, the passed glass articles passed through the drop zone by the carrier.

The cleaning apparatus may include: a cleaning head; and a moving unit configured to move the cleaning head between a standby position where the cleaning head does not disturb the passed glass articles passed through the drop zone and a working position where the gripper are cleaned by the cleaning head.

The cleaning apparatus may further include a sensor configured to sense a position of the cleaning head, wherein the conveyor may stop the carrier when the cleaning head is not in the working position, or when the cleaning head is not in the standby position.

The conveyor may return to the loading zone after passing through an unloading zone after the processing zone, wherein the carrier may unload the passed glass articles, processed in the processing zone, in the unloading zone and return to the loading zone via the conveyor.

According to another aspect of the present disclosure, there is provided a glass processing method including: loading glass articles to a carrier comprising a gripper by picking up the glass articles with the gripper such that the gripper contact the glass articles; conveying the glass articles by conveying the carrier with a conveyor; unloading the glass articles from the carrier by causing the gripper to be detached from the glass articles; and cleaning the gripper.

The cleaning of the gripper may include: moving a cleaning head from a standby position to a working position; cleaning the gripper with the cleaning head; and moving the cleaning head from the working position to the standby position.

The moving of the cleaning head from the standby position to the working position may include moving the cleaning head in a horizontal direction and raising the cleaning head in a vertical direction, and wherein the moving of the cleaning head from the working position to the standby position may include lowering the cleaning head in a direction opposite to the vertical direction and moving the cleaning head in a direction opposite to the horizontal direction.

The gripper may comprise a plurality of fingers. The cleaning of the gripper may include simultaneously bringing the cleaning head into contact with the plurality of fingers.

The cleaning of the gripper may include sweeping the gripper with a cleaning head including a brush.

The cleaning of the gripper may include injecting fluid with a cleaning head including a nozzle.

The glass processing method may further include sensing a position of the cleaning head.

The glass processing method may further include: inspecting the glass articles; and sorting the glass articles into passed glass articles or failed glass articles according to a result of the inspecting, wherein, when the glass articles are sorted into the failed glass articles, the loading of the glass articles and the cleaning of the gripper may be performed in a drop zone, and when the glass articles are sorted into the passed glass articles, the glass articles may pass through the drop zone along with the carrier and be unloaded from the carrier in a unloading zone.

BRIEF DESCRIPTION OF THE DRAWINGS

Embodiments of the present disclosure will be more clearly understood from the following detailed description taken in conjunction with the accompanying drawings in which:

FIGS. 9 to 13 are views for explaining a glass processing method according to the present disclosure.

DETAILED DESCRIPTION OF THE EMBODIMENTS

Figure 1:
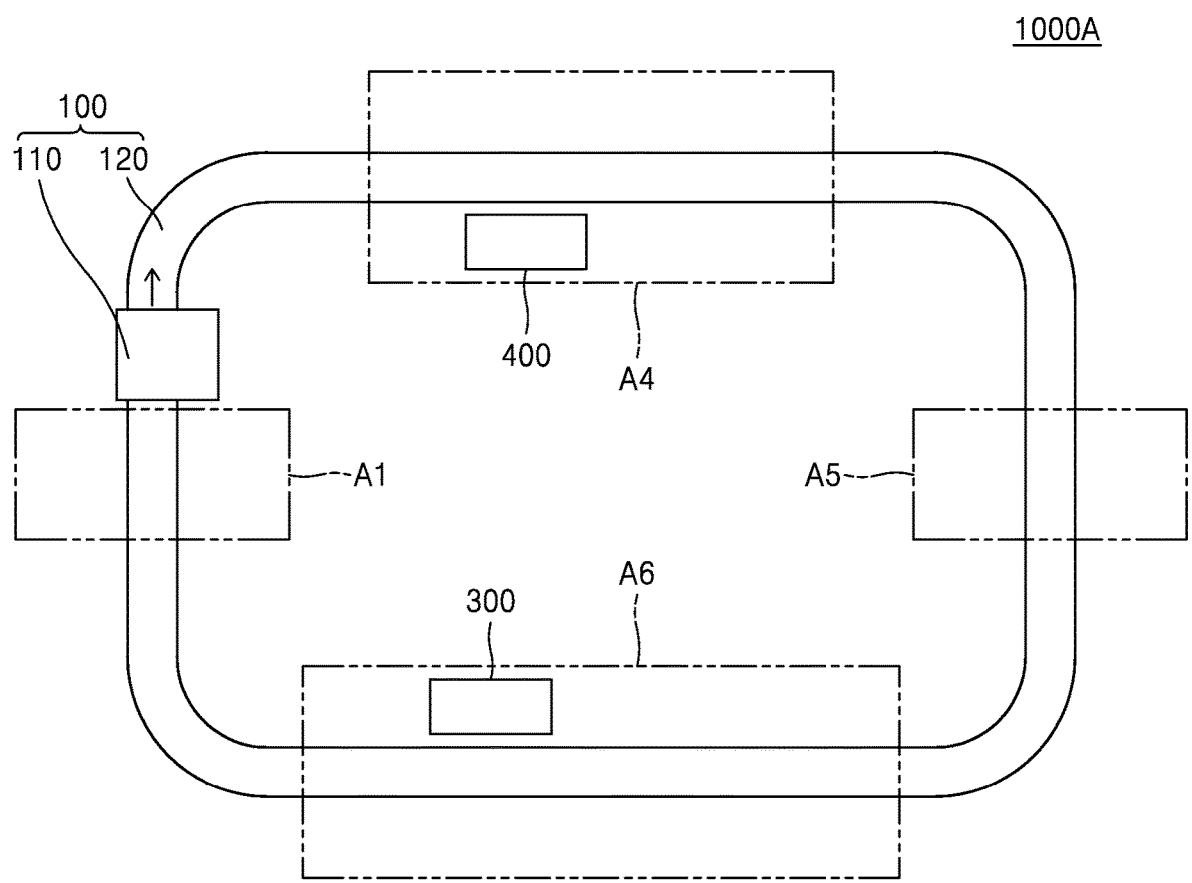
FIG. 1 is a plan view of a glass processing apparatus according to the present disclosure.

Embodiments of the present disclosure will be described in detail with reference to the accompanying drawings. Wherever possible, like reference numerals may be used to refer to the same or like parts throughout the drawings. In addition, various elements in the drawings are schematically drawn, and the present disclosure is not limited by relative lengths or distances drawn in the drawings. It will be understood that various embodiments presented herein are intended to more fully describe the present disclosure and not to limit the present disclosure. It will also be apparent to those skilled in the art that various variations and modifications may be made to the embodiments without departing from the spirit of the present disclosure. Therefore, it will be understood that the scope of the present disclosure is defined by claims and their equivalents and is not limited to embodiments set forth below. It will also be understood that the embodiments may be practiced alone or in combination with another embodiment (or other embodiments).

Directional terms used herein—for example vertical and horizontal—are made only with reference to the figures and are not intended to imply absolute orientation. For example, a vertical direction is not necessarily parallel to a direction of gravity.

FIG. 1 is a plan view of a glass processing apparatus 1000A according to the present disclosure.

Referring to FIG. 1, the glass processing apparatus 1000A includes a glass transportation apparatus 100 and a cleaning apparatus 300. The glass transportation apparatus 100 transports glass articles. The glass articles may be articles made of glass with any shape, for example, a glass sheet. The glass articles may include silicate glass, aluminosilicate glass, borosilicate glass, aluminoborosilicate glass, alkali-aluminosilicate glass, alkali-borosilicate glass, alkali-aluminoborosilicate glass, soda lime glass, or a combination thereof although the glass articles are not limited thereto and may have various glass compositions. The glass transportation apparatus 100 includes a carrier 110 configured to hold glass articles and a conveyor 120 configured to convey the carrier 110.

The conveyor 120 passes through a loading zone A1 and an unloading zone A5. The conveyor 120 conveys the carrier 110 from the loading zone A1 to the unloading zone A5. The glass articles are fed into the glass transportation apparatus 100 in the loading zone A1. In some embodiments, the loading zone A1 may be connected to a glass article manufacturing apparatus and glass articles manufactured by the glass article manufacturing apparatus may be conveyed to the loading zone A1. In other embodiments, the loading zone A1 may not be connected to the glass article manufacturing apparatus. Glass articles obtained from a glass article manufacturer or manufactured by a separate glass article manufacturing apparatus may be fed into the loading zone A1. The carrier 110 picks up the glass articles in the loading zone A1. That is, the glass articles are loaded to the carrier 110. Then, the carrier 110 is moved by the conveyor 120 from the loading zone A1 to the unloading zone A5 and the glass articles are unloaded from the carrier 110 in the unloading zone A5.

In some embodiments, the conveyor 120 may form a loop in a plane to circulate the carrier 110. For example, the conveyor 120 further passes through a return zone A6. For example, after the glass articles are unloaded from the carrier 110 in the unloading zone A5, the carrier 110 may be conveyed by the conveyer 120 from the unloading zone A5 to the loading zone A1 again through the return zone A6. Then, the carrier 110 may pick up next glass articles in the loading zone A1. The glass transportation apparatus 100 will be described below in detail with reference to FIGS. 3A to 3C.

In some embodiments, the glass processing apparatus 1000A may further include processing equipment 400. In some embodiments, the processing equipment 400 may be any apparatus configured to process glass articles. For example, the processing equipment 400 may be configured to coat, cut, edge, grind, and/or polish the glass articles. The processing equipment 400 is located in a processing zone A4 and the conveyor 120 further passes through the processing zone A4. The conveyor 120 may convey the carrier 110 from the loading zone A1 to the processing zone A4 and from the processing zone A4 to the unloading zone A5. When the glass transportation apparatus 100 brings the glass articles to the processing zone A4, the processing equipment 400 processes, e.g., coats, cuts, edges, grinds, and/or polishes, the glass articles, and when the processing is completed, the glass articles with the carrier 110 exit the processing zone A4 by means of the conveyor 120.

The cleaning apparatus 300 cleans pads P1 and P2 (see FIGS. 3A to 3C) of fingers F1 and F2 (see FIGS. 3A to 3C) of a gripper 111 (see FIGS. 3A to 3C) of the carrier 110. In some embodiments, unlike in FIG. 1, the cleaning apparatus 300 may be located in the unloading zone A5. After the glass articles are unloaded from the carrier 110 in the unloading zone A5, the cleaning apparatus 300 may clean the pads P1 and P2 of the fingers F1 and F2 of the gripper 111 of the carrier 110 in the unloading zone A5. In other embodiments, as shown in FIG. 1, the cleaning apparatus 300 may be located in the return zone A6. After the glass articles are unloaded from the carrier 110 in the unloading zone A5, when an empty carrier 110 passes the return zone A6, the cleaning apparatus 300 may clean the pads P1 and P2 of the fingers F1 and F2 of the gripper 111 of the empty carrier 110. The cleaning apparatus 300 will be described below in detail with reference to FIGS. 4A and 4B.

In certain exemplary embodiments, the glass processing apparatus 1000A includes the cleaning apparatus 300 that is capable of cleaning the pads P1 and P2 of the fingers F1 and F2 of the gripper 111 of the carrier 110. Thus, after the glass articles are unloaded from the carrier 110, debris and/or particles from the glass articles and/or dust from a surrounding environment may be removed from the pads P1 and P2 of the fingers F1 and F2 of the gripper 111 of the carrier 110. As a result, it is possible to prevent debris, particles, and/or dust remaining on the pads P1 and P2 of the fingers F1 and F2 of the gripper 111 of the carrier 110 from damaging subsequent glass articles loaded to the carrier 110. In addition, as there is no need to add manpower to clean the pads P1 and P2 of the fingers F1 and F2 of the gripper 111 of the carrier 110, manpower may be saved.

Figure 2:
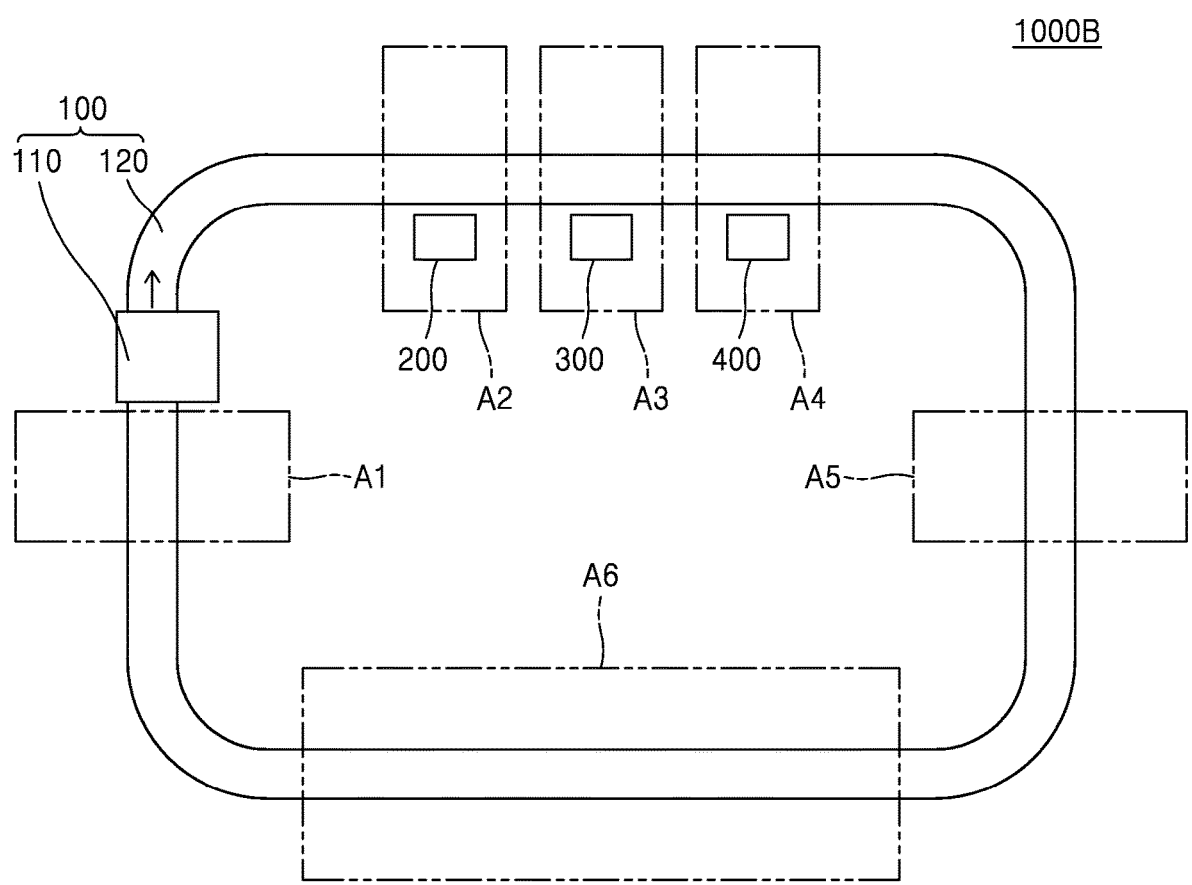
FIG. 2 is a plan view of a glass processing apparatus according to the present disclosure.

FIG. 2 is a plan view of a glass processing apparatus 1000B according to the present disclosure.

Referring to FIG. 2, the glass processing apparatus 1000B may further include an inspection apparatus 200. The inspection apparatus 200 inspects glass articles and sorts the glass articles into passed glass articles or failed glass articles according to a result of the inspection. For example, the inspection apparatus 200 may determine characteristics such as the number, locations, and/or sizes of defects such as cracks and/or chips in the glass articles, determine stresses in the glass articles, and/or inspect warpage of the glass articles. The inspection apparatus 200 may sort glass articles into passed glass articles or failed glass articles based on various characteristics such as defect characteristics, stress characteristics, and/or warpage characteristics of the glass articles.

Conveyor 120 may further pass through an inspection zone A2 and a drop zone A3. The conveyor 120 may convey a carrier 110 from a loading zone A1 to the inspection zone A2 and from the inspection zone A2 to the drop zone A3. In addition, when a processing zone A4 is present, the conveyor 120 may convey the carrier 110 from the drop zone A3 to an unloading zone A5 through the processing zone A4. In some embodiments, the conveyor 120 may further convey the carrier 110 from the unloading zone A5 to a return zone A6 and from the return zone A6 to the loading zone A1.

The inspection apparatus 200 is located in the inspection zone A2. When the conveyor 120 brings the carrier 100 with glass articles loaded therein into the inspection zone A2, the inspection apparatus 200 inspects the glass articles and sorts the glass articles into passed glass articles or failed glass articles according to a result of the inspection. When the inspection is completed, the glass articles with the carrier 110 are conveyed by the conveyor 120 from the inspection zone A2 to the inspection zone.

When the glass articles are sorted into passed glass articles, the glass articles pass through the drop zone A3 by means of the conveyor 120 along with the carrier 110. When a processing equipment 400 is present, the glass articles are conveyed by the conveyor 120 from the drop zone A3 to the processing zone A4 along with the carrier 110 and are processed by the processing equipment 400 in the processing zone A4. Next, the glass articles are conveyed by the conveyor 120 from the processing zone A4 to the unloading zone A5 along with the carrier 110. In the unloading zone A5, the glass articles are unloaded from the carrier 110. When the glass articles are sorted into failed glass articles, the glass articles are unloaded from the carrier 110 in the drop zone A3.

In some embodiments, as shown in FIG. 2, a cleaning apparatus 300 may be located in a drop zone A3. In the drop zone A3, after glass articles sorted into failed glass articles are unloaded from the carrier 110, the cleaning apparatus 300 may clean pads P1 and P2 (see FIGS. 3A to 3C) of fingers F1 and F2 (see FIGS. 3A to 3C) of a gripper 111 (see FIGS. 3A to 3C) of the carrier 110. When glass articles sorted into passed glass articles pass through the drop zone A3 along with the carrier 110, the cleaning apparatus 300 may not clean the pads P1 and P2 of the fingers F1 and F2 of the gripper 111. That is, the cleaning apparatus 300 may clean only empty carrier(s), which do not carry glass articles, among carriers passing through the drop zone A3 and may not clean carrier(s) carrying glass articles among the carriers passing through the drop zone A3.

In other embodiments, the cleaning apparatus 300 may be located in the return zone A6, as shown in FIG. 1. Because all of the carriers 110 passing through the return zone A6 are empty, the cleaning apparatus 300 may clean all the carriers 110 passing through the return zone A6. In other embodiments, the cleaning apparatus 300 may be located in the processing zone A4. The cleaning apparatus 300 may clean only empty carrier(s), which do not carry glass articles, among carriers passing through the processing zone A4 and may not clean carrier(s) carrying glass articles among the carriers passing through the processing zone A4.

In certain exemplary embodiments, the glass processing apparatus 1000B includes the cleaning apparatus 300 that is capable of cleaning the pads P1 and P2 of the fingers F1 and F2 of the gripper 111 of the carrier 110. Thus, it is possible to prevent debris, particles, and/or dust from falling from the pads P1 and P2 of the fingers F1 and F2 of the gripper 111 of the carrier 110 to the processing equipment 400 and thus contaminating the processing equipment 400. In addition, it is possible to prevent debris, particles, and/or dust remaining on the pads P1 and P2 of the fingers F1 and F2 of the gripper 111 of the carrier 110 from damaging subsequent glass articles loaded to the carrier 110. In addition, as there is no need to add manpower to clean the pads P1 and P2 of the fingers F1 and F2 of the gripper 111 of the carrier 110, manpower may be saved.

Figure 3A:
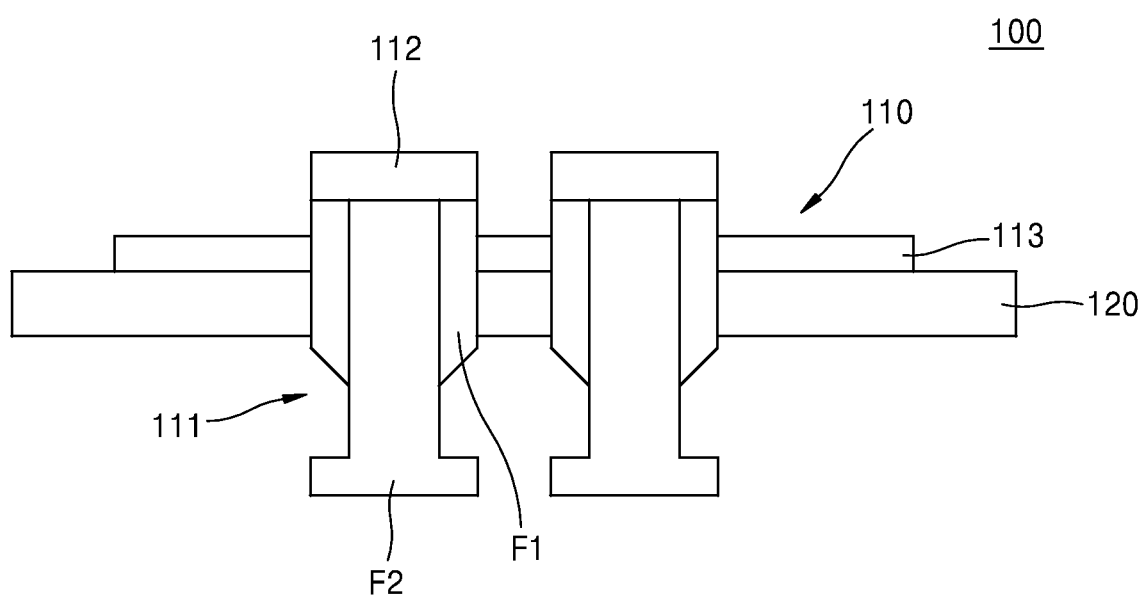
FIG. 3A is a front view of a glass transportation apparatus in a glass processing apparatus according to the present disclosure.
Figure 3B:
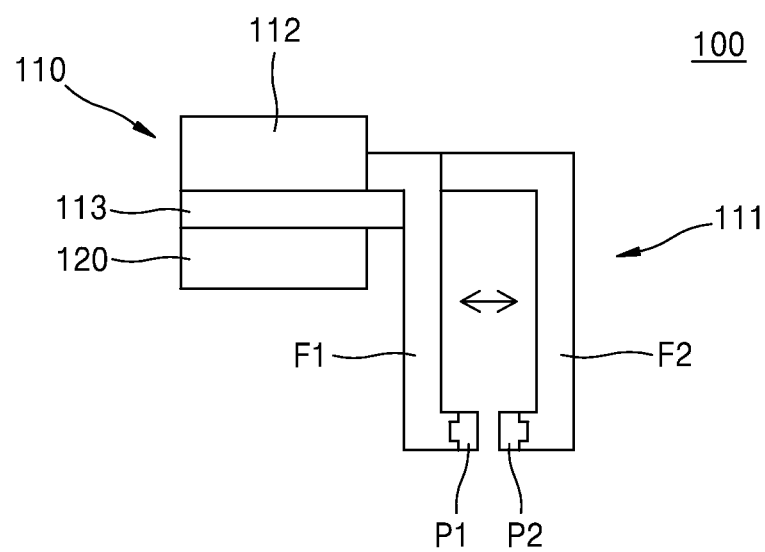
FIG. 3B is a side view of a glass transportation apparatus in a glass processing apparatus according to the present disclosure.
Figure 3C:
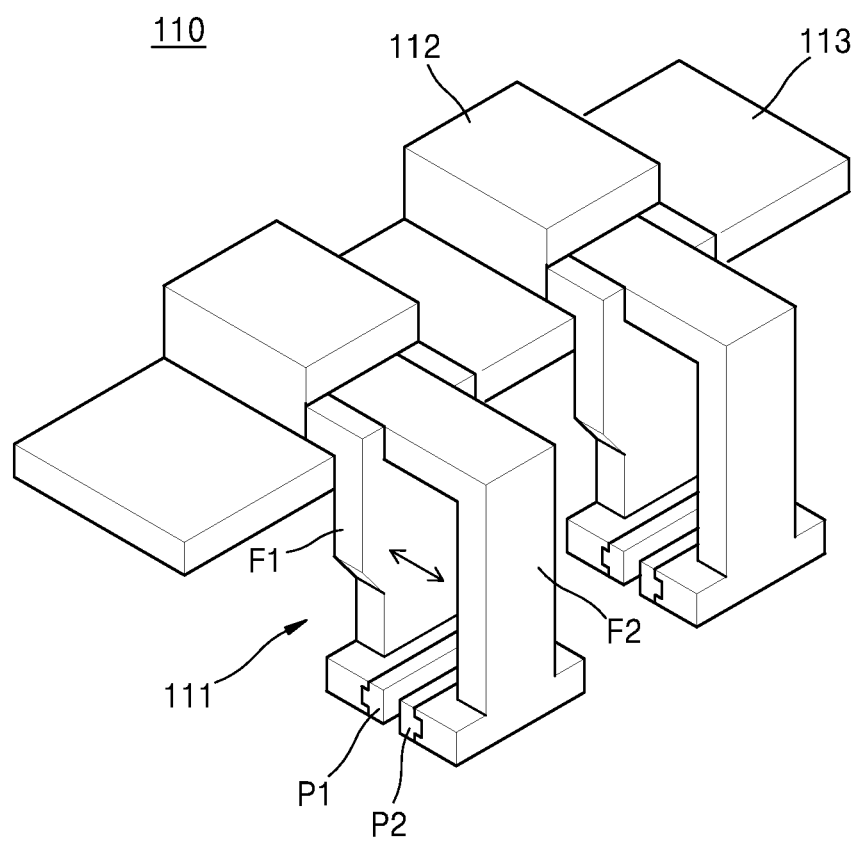
FIG. 3C is a perspective view of a carrier of a glass transportation apparatus in a glass processing apparatus according to the present disclosure.

FIG. 3A is a front view of a glass transportation apparatus 100 in a glass processing apparatus 1000A or 1000B according to the present disclosure. FIG. 3B is a side view of the glass transportation apparatus 100 in the glass processing apparatus 1000A or 1000B according to the present disclosure. FIG. 3C is a perspective view of a carrier 110 of the glass transportation apparatus 100 in the glass processing apparatus 1000A or 1000B according to the present disclosure.

Referring to FIGS. 3A to 3C, the glass transportation apparatus 100 includes a conveyor 120 and a carrier 110. The conveyor 120 conveys the carrier 110. The conveyor 120 may include a belt, a roller, and/or a chain to convey the carrier 110. The carrier 110 may include a body 113 and a gripper 111 attached to the body 113. The body 113 may be placed on the conveyor 120, suspended under the conveyor 120, attached to the conveyor 120, fixed to the conveyor 120, and/or contact the conveyer 120.

The gripper 111 may be configured to grip glass articles. Although it is shown in FIG. 3A that the carrier 110 has a pair of grippers 111, the carrier 110 may include more grippers 111 (e.g., two pairs of gripper 111) or less grippers 111 (e.g., only one gripper 111). The gripper 111 has a pair of fingers F1 and F2 configured to grip glass articles. The pair of fingers F1 and F2 may face each other and, in an exemplary embodiment, extend approximately in a vertical direction. It is shown in FIGS. 3A to 3C that the pair of fingers F1 and F2 are located on one side of the body 113. However, in other embodiments, the pair of fingers F1 and F2 may be located under the body 113. The pair of fingers F1 and F2 may have a pair of pads P1 and P2. The pair of pads P1 and P2 directly contacts glass articles when the glass articles are loaded to the carrier 110.

The gripper 111 further has a moving unit 112 configured to adjust the distance between the pair of fingers F1 and F2 and thus the distance between the pair of pads P1 and P2. The moving unit 112 may include, for example, a cylinder or a belt. For example, the moving unit 112 may adjust the distance between the pair of pads P1 and P2 by moving a second finger F2 in a horizontal direction with respect to a first finger F1. When glass articles are loaded to the carrier 110, the moving unit 112 may move the second finger F2 toward the first finger F1 so that the pair of pads P1 and P2 come into contact with the glass articles, and thus, the distance between the pads P1 and P2 may be reduced. On the other hand, when glass articles are unloaded from the carrier 110, the moving unit 112 may move the second finger F2 away from the first finger F1 so that the pair of pads P1 and P2 are separated from the glass articles, and thus, the distance between the pair of pads P1 and P2 may be increased. It is shown in FIGS. 3A to 3C that the moving unit 112 is located on the body 113. However, in other embodiments, the moving unit 112 may be located under the body 113.

Figure 4A:
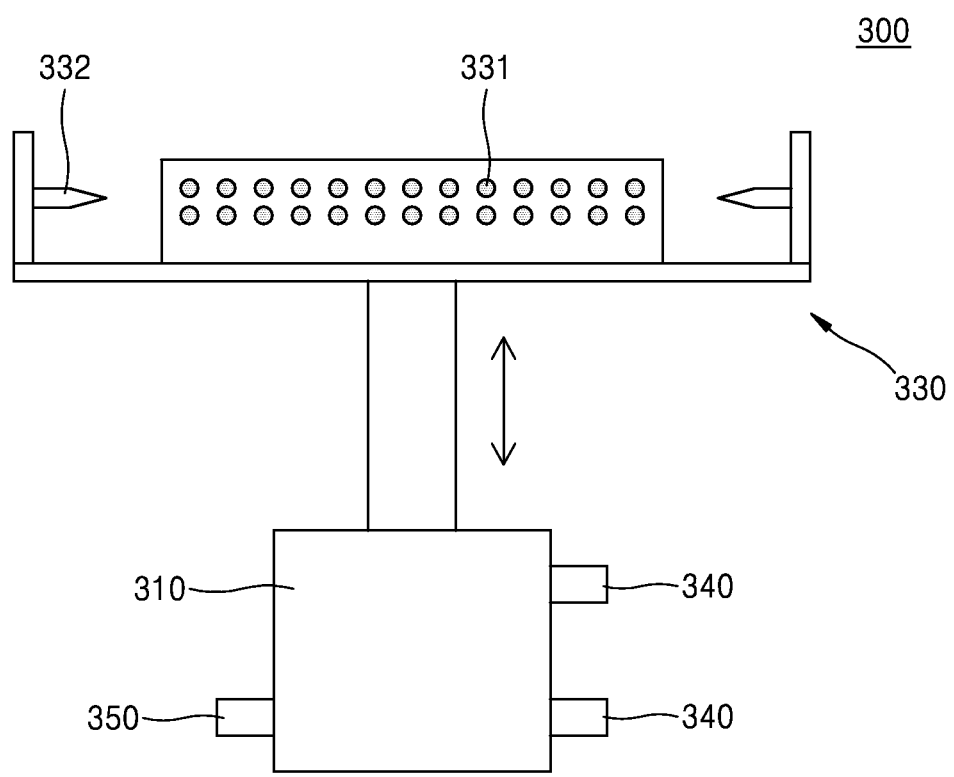
FIG. 4A is a front view of a cleaning apparatus in a glass processing apparatus according to the present disclosure.
Figure 4B:
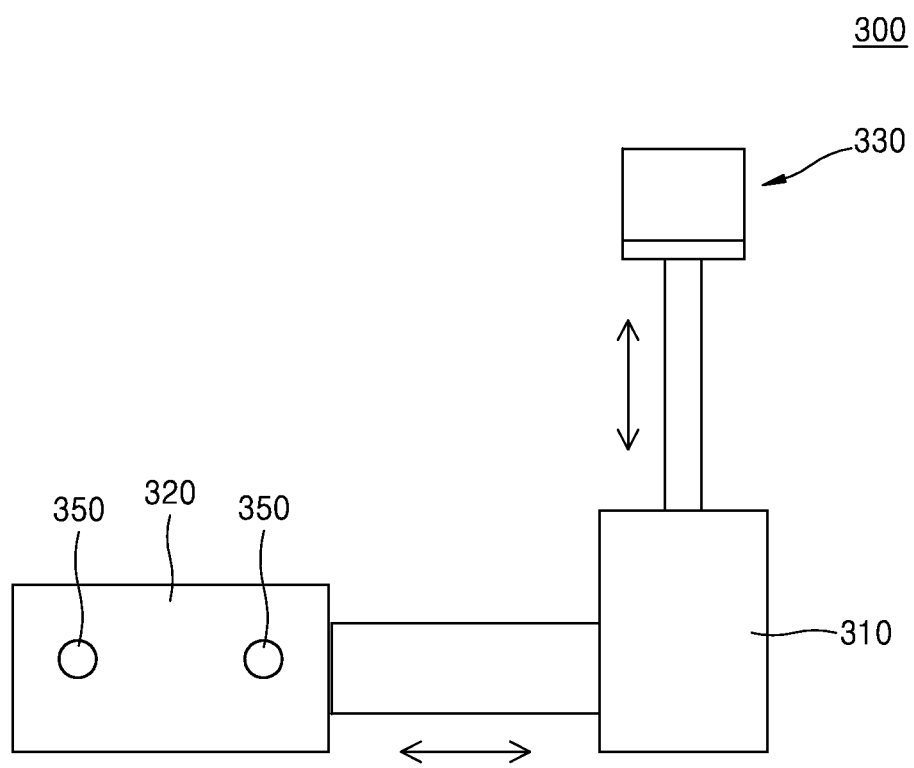
FIG. 4B is a side view of a cleaning apparatus in a glass processing apparatus according to the present disclosure.

FIG. 4A is a front view of a cleaning apparatus 300 in a glass processing apparatus 1000A or 1000B according to an embodiment of the present disclosure. FIG. 4B is a side view of the cleaning apparatus 300 in the glass processing apparatus 1000A or 1000B according to an embodiment of the present disclosure.

Referring to FIGS. 4A and 4B, the cleaning apparatus 300 includes a cleaning head 330 and a moving unit 310 and/or 320. The moving unit 310 and/or 320 may move the cleaning head 330. The moving unit 310 and/or 320 may include, for example, a cylinder or a belt. In some embodiments, the moving unit 310 and/or 320 may include a first moving unit 310 configured to move the cleaning head 330 in a first direction, such as a vertical direction. and/or a second moving unit 320 configured to move the cleaning head 330 in a second direction such as a horizontal direction. The cleaning head 330 may be configured to clean the pads P1 and P2 (see FIGS. 3A to 3C) of the fingers F1 and F2 (see FIGS. 3A to 3C) of the gripper 111 (see FIGS. 3A to 3C) of the carrier 110.

In some embodiments, the cleaning head 330 may include a brush 331 and/or a nozzle 332. The brush 331 may be configured to sweep a pair of pads P1 and P2 (see FIGS. 3A to 3C). The brush 331 may pass between the pads P1 and P2 by the moving unit 310 and/or 320 and may contact the pair of pads P1 and P2. The nozzle 332 may be configured to inject fluid toward the pair of pads P1 and P2. The fluid may be air, an inert gas, and/or a gas including a cleaning material. The nozzle 332 may be oriented in a horizontal direction perpendicular to a direction in which the pair of pads P1 and P2 are spaced apart from each other. In other embodiments, the cleaning head 330 may include other cleaning tools such as a roller, wiper, and/or a scraper.

Figure 7A:
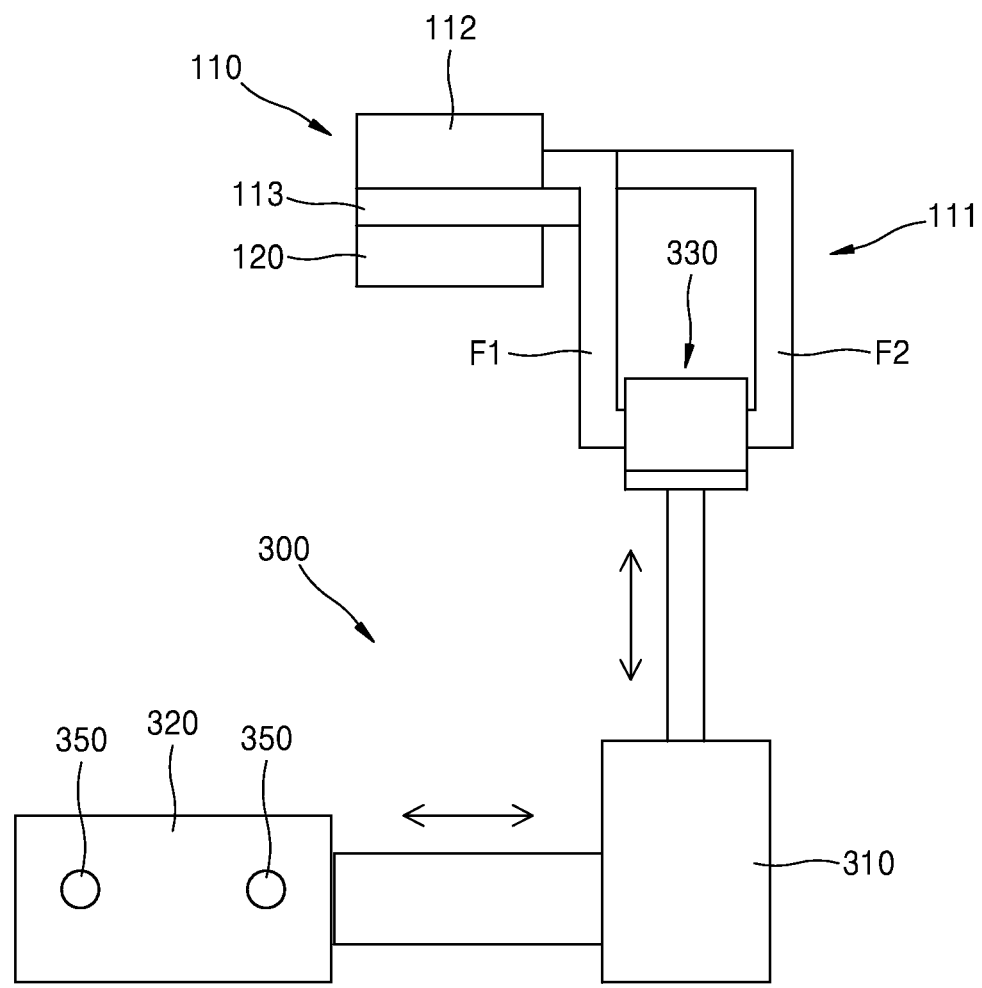
Figure 7B:
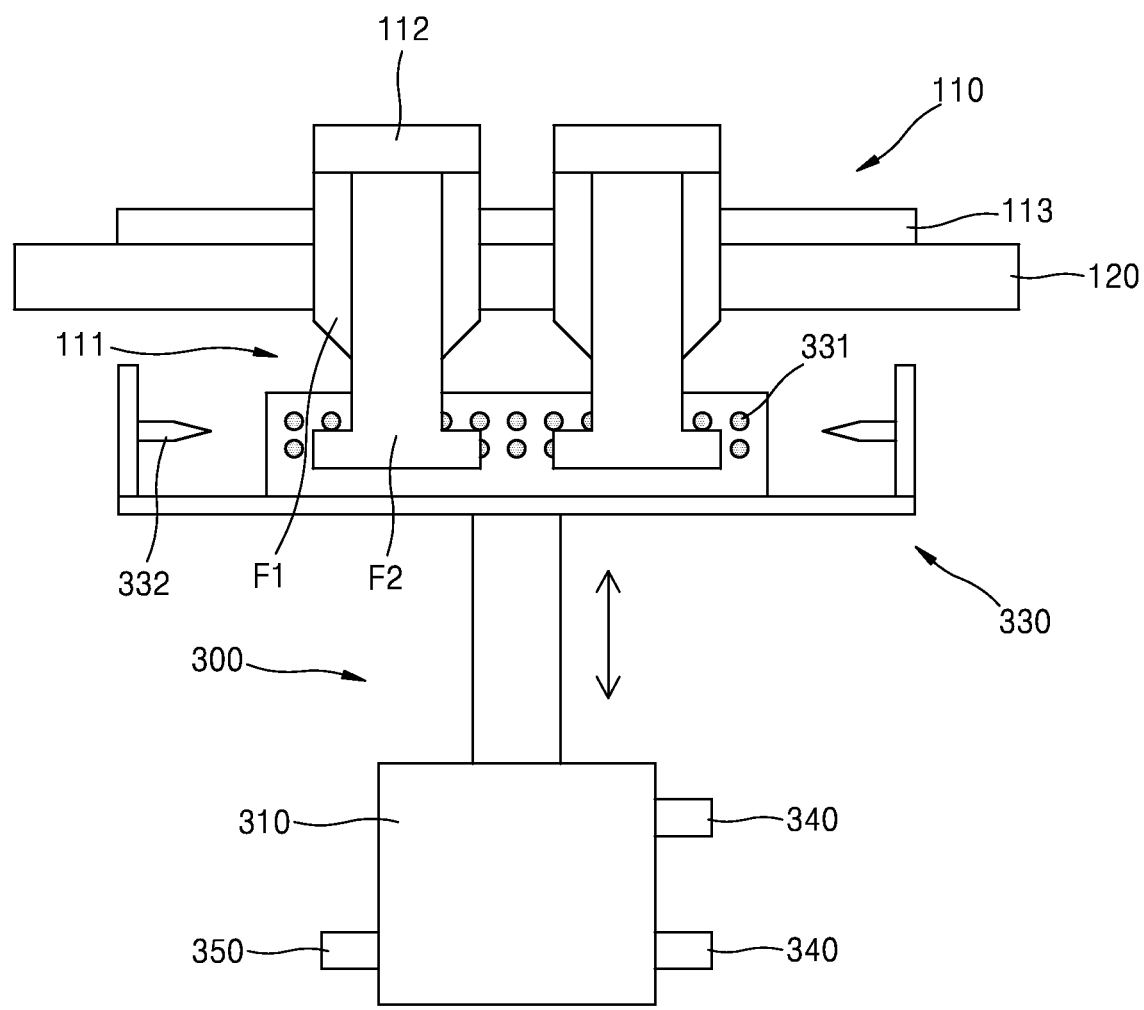

As shown in FIG. 7B, in some embodiments, the cleaning head 330 may be sufficiently long laterally to simultaneously clean two pairs of pads P1 and P2. However, in other embodiments, the cleaning head 330 may be shorter to simultaneously clean only a pair of pads P1 and P2 or may be longer to simultaneously clean three or more pairs of pads P1 and P2.

In some embodiments, the cleaning apparatus 300 may further include sensor(s) 340 and/or 350 configured to sense the position of the cleaning head 330. For example, the cleaning apparatus 300 may include a first sensor 340 sensing a vertical position of the cleaning head 330 and/or a second sensor 350 sensing a horizontal position of the cleaning head 330. FIGS. 4A and 4B illustrate that the first sensor 340 is attached to the first moving unit 310 and the second sensor 350 is attached to the second moving unit 320. However, in other embodiments, the first sensor 340 and the second sensor 350 may be attached to the cleaning head 330.

Figure 5:
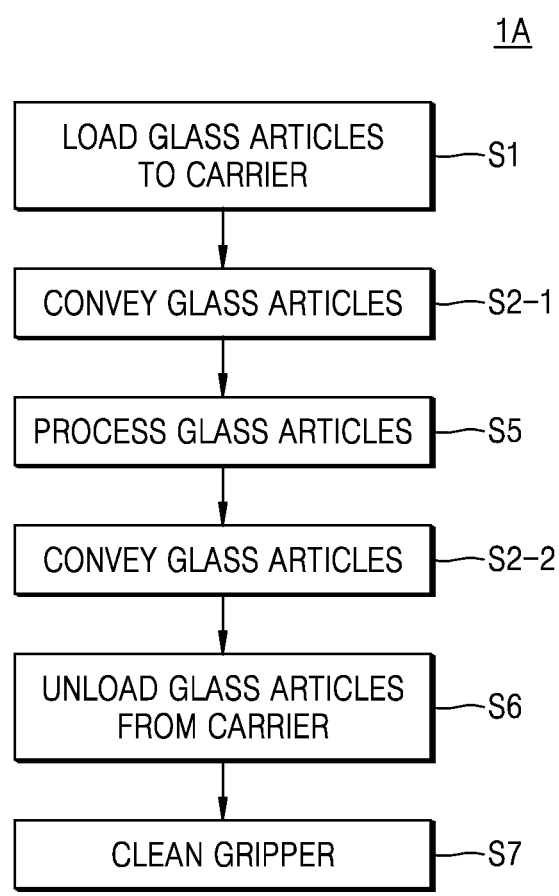
FIG. 5 is a flowchart of a glass processing method according to the present disclosure.

FIG. 5 is a flowchart of a glass processing method 1A according to the present disclosure. FIGS. 6A to 7B are views for explaining the glass processing method 1A according to the present disclosure.

Figure 6A:
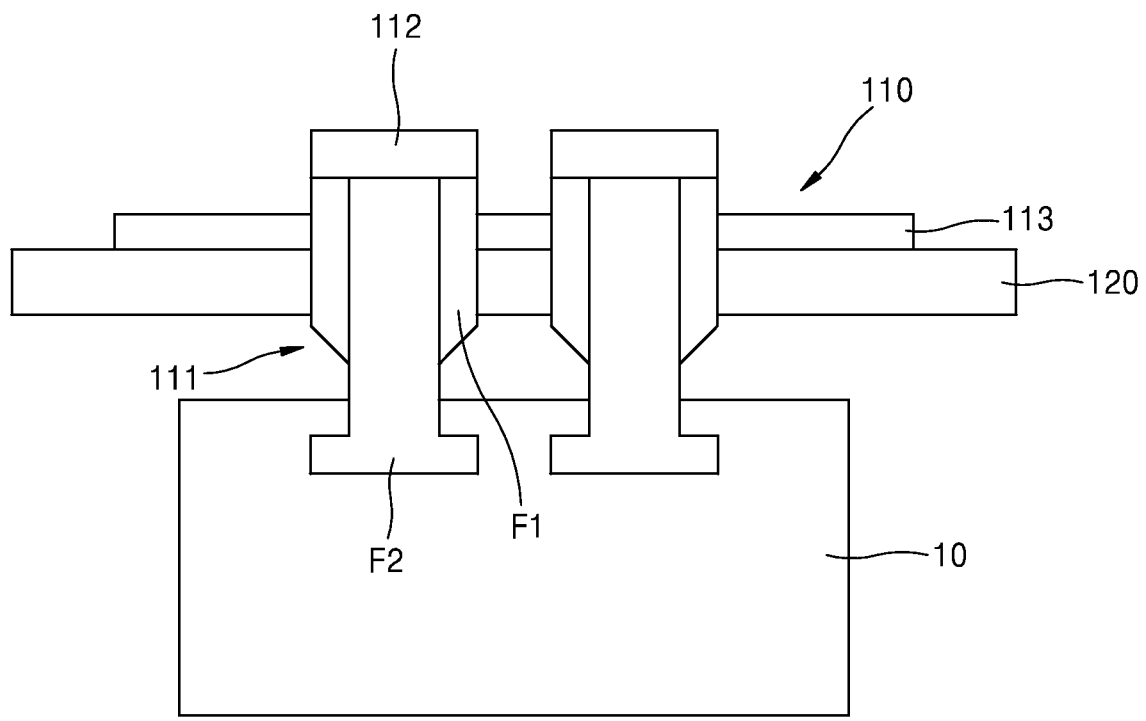
FIGS. 6A to 7B are views for explaining a glass processing method according to the present disclosure.
Figure 6B:
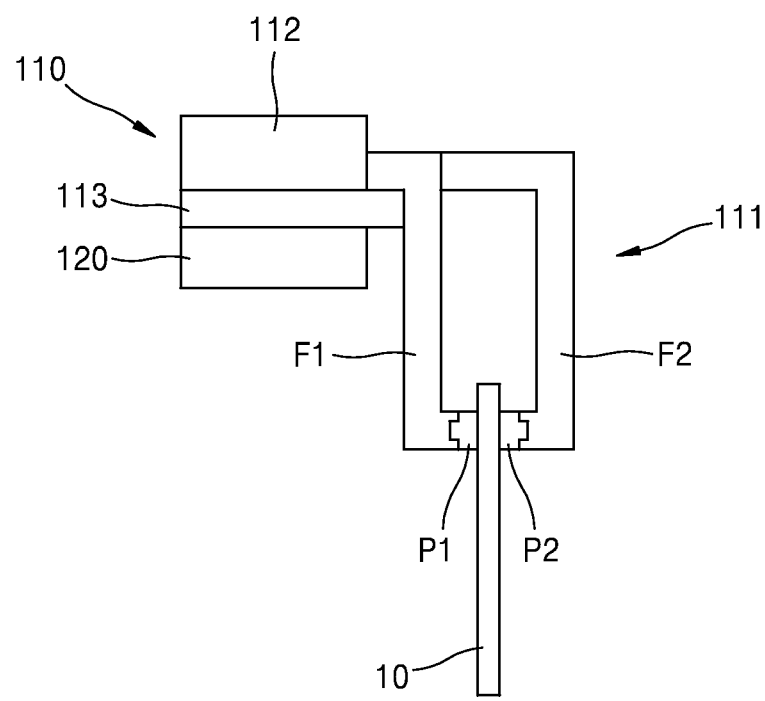

Referring to FIGS. 1, 5, 6A and 6B, glass articles 10 are loaded to the carrier 110 in the loading zone A1 (step S1). That is, the pair of pads P1 and P2 of the pair of fingers F1 and F2 of the gripper 111 of the carrier 110 may be brought into contact with the glass articles 10 and thus the gripper 111 may grip the glass articles 10. Although it is shown in FIGS. 6A and 6B that a pair of grippers 111 are used to grip one glass articles 10, fewer grippers (e.g., only one gripper 111) or more grippers (e.g., two pairs of grippers 111) may be used to grip one glass article 10.

Next, the glass articles 10 are conveyed from the loading zone A1 to the processing zone A4 by conveying the carrier 110 with the glass articles 10 loaded therein from the loading zone A1 to the processing zone A4 (step S2-1). Next, the processing equipment 400 processes the glass articles 10 in the processing zone A4. For example, the processing equipment 400 may cut, coat, edge, grind, and/or polish the glass articles 10. Next, the glass articles 10 are unloaded from the carrier 110 in the unloading zone A5 by causing the pair of pads P1 and P2 to separate from the glass articles 10. In some embodiments, after the glass articles 10 are unloaded, an empty carrier 110 is conveyed by the conveyor 120 from the unloading zone A5 to the loading zone A1 through the return zone A6. In the loading zone A1, the conveyor 120 may pick up next glass articles.

Referring to FIGS. 1, 5, 7A and 7B, in the unloading zone A5 or the return zone A6, the cleaning apparatus 300 cleans the pair of pads P1 and P2 of the pair of fingers 111 of the gripper 111 of the carrier 110. When the cleaning apparatus 300 is waiting for the empty carrier 110, the cleaning head 330 may be in a standby position such that the cleaning head 330 does not collide with the empty carrier 110. When the empty carrier 110 reaches the vicinity of the cleaning apparatus 300, the cleaning head 330 may be moved by the moving unit 310 and/or 320 to a working position to clean the pair of pads P1 and P2. For example, the working position may be between the pair of pads P1 and P2, and the standby position may be below a path through which the pair of pads P1 and P2 pass. In some embodiments, the cleaning head 330 may be moved finely by the moving unit 310 and/or 320 in the vertical direction and/or the horizontal direction from the working position during cleaning. In some embodiments, the pair of pads P1 and P2 may be swept with a cleaning head 330 including a brush 331 to clean the pair of pads P1 and P2. Additionally or alternatively, fluid may be injected into the pair of pads P1 and P2 with a cleaning head 330 including a nozzle 332 to clean the pair of pads P1 and P2. The cleaning head 330 may contact the pair of pads P1 and P2 simultaneously to clean the pair of pads P1 and P2. For example, the brush 331 of the cleaning head 330 may contact the pair of pads P1 and P2 simultaneously. However, for example, the nozzle 332 of the cleaning head 330 may not contact the pair of pads P1 and P2. When the cleaning is completed, the cleaning head 330 may be moved back to the standby position by the moving unit 310 and/or 320.

In some embodiments, the glass processing method 1A may further include sensing the position of the cleaning head 330. For example, when the position of the cleaning head 330 sensed by the sensors 340 and/or 350 is not the working position even though an empty carrier 110 has reached the vicinity of the cleaning apparatus 300, or when the position of the cleaning head 330 sensed by the sensors 340 and/or 350 is not the standby position even after the carrier 110 moves away from the cleaning apparatus 300, an alarm may be sent to an operator and/or the conveyor 120 may be stopped. Thus, the cleaning head 330 may be prevented from colliding with the carrier 110 and/or the cleaning head 330 may be prevented from omitting cleaning an empty carrier.

In some embodiments, step S5 of processing glass articles may be omitted. In this case, the glass articles 10 may be loaded to the carrier 110 (step S1) and the glass articles 10 may be conveyed from the loading zone A1 to the unloading zone A5 (step S2-1 and step S2-2). Next, the glass articles 10 may be unloaded from the carrier 110 (step S6), and then the pair of pads P1 and P2 may be cleaned (step S7).

The glass processing method 1A according to the present disclosure includes cleaning the pads P1 and P2 of the fingers F1 and F2 of the gripper 111 of the carrier 110. Thus, after the glass articles 10 are unloaded from the carrier 110, debris and/or particles from the glass articles (and processing thereof) and/or dust from a surrounding environment may be removed from the pads P1 and P2 of the fingers F1 and F2 of the gripper 111 of the carrier 110. As a result, it is possible to prevent debris, particles, and/or dust remaining on the pads P1 and P2 of the fingers F1 and F2 of the gripper 111 from damaging subsequent glass articles loaded to the carrier 110.

Figure 8:
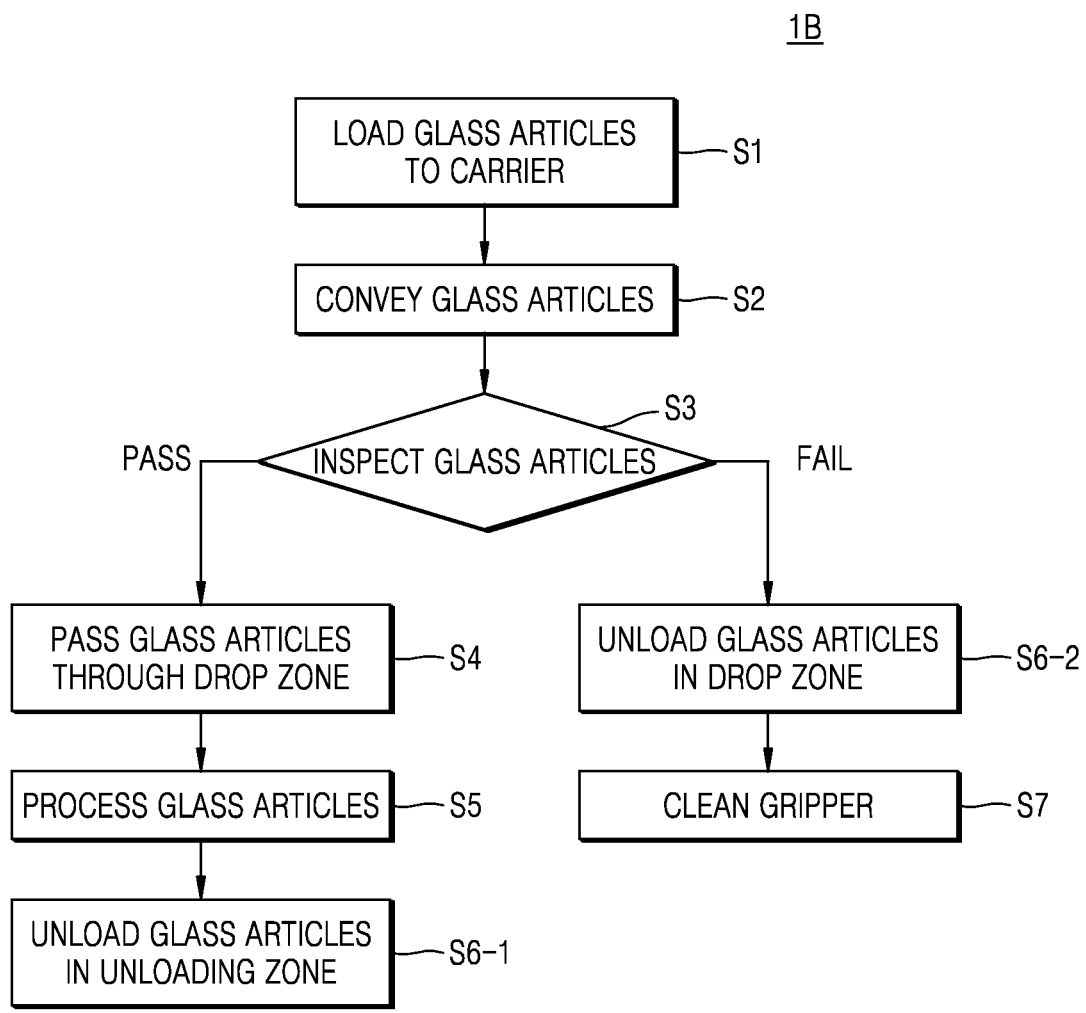
FIG. 8 is a flowchart of a glass processing method according to the present disclosure.

FIG. 8 is a flowchart of a glass processing method 1B according to an embodiment of the present disclosure. FIGS. 9 to 13 are views for explaining the glass processing method 1B according to an embodiment of the present disclosure.

Referring to FIGS. 2, 6A, 6B, and 8, first, the glass articles 10 are loaded to the carrier 110 in the loading zone A1 (step S1). Next, the glass articles 10 are conveyed from the loading zone A1 to the inspection zone A2 by conveying the carrier 110 with the glass articles 10 loaded therein from the loading zone A1 to the inspection zone A2.

Next, in the inspection zone A2, the inspection apparatus 200 inspects the glass articles 10 (step S3). The inspection apparatus 200 may determine characteristics such as defect characteristics (e.g., the number, locations, and/or sizes of defects such as cracks and/or chips in the glass articles 10), stress characteristics, and warpage characteristics of the glass articles 10. In addition, the inspection apparatus 200 may sort the glass articles 10 into passed glass articles or failed glass articles based on the characteristics of the glass articles 10 such as the defect characteristics, the stress characteristics, and the warpage characteristics. When the inspection is completed, the glass articles 10 are conveyed by the conveyor 120 along with the carrier 110 from the inspection zone A2 to the drop zone A3.

Figure 9:
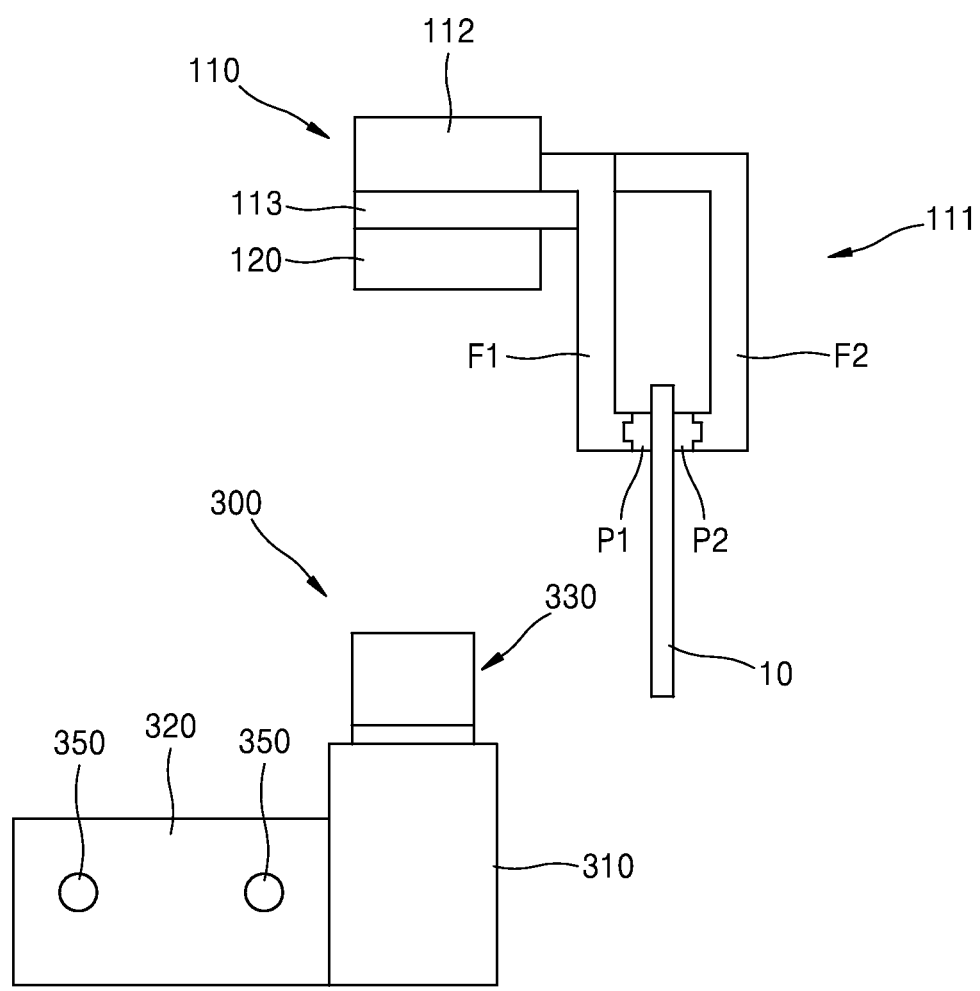

Referring to FIGS. 2, 8 and 9, when the glass articles 10 are sorted into passed glass articles, the glass articles 10 pass through the drop zone A3 along with the carrier 110 (step S4) and move to the processing zone A4. When the glass articles 10 pass through the drop zone A3 along with the carrier 110, the cleaning head 330 may be located in a standby position so as not to interfere with the movement of the glass articles 10. Then, when the processing equipment 400 is present, the glass articles 10 may be processed by the processing equipment 400 in the processing zone A4 (step S5). After the processing is completed, the glass articles 10 are moved by the conveyor 120 from the processing zone A4 to the unloading zone A5 along with the carrier 110. In the unloading zone A5, the glass articles 10 are unloaded from the carrier 110 (step S6-1). In some embodiments, after the glass articles 10 are unloaded, an empty carrier 110 may be conveyed by the conveyor 120 from the unloading zone A5 to the loading zone A1 through the return zone A6. In the loading zone A1, the carrier 110 may be loaded with new glass articles 10.

In some embodiments, step S5 of processing glass articles 10 may be omitted. In this case, glass articles 10 sorted into passed glass articles in the inspection operation (step S3) may be conveyed from the inspection zone A2 to the unloading zone A5 through the drop zone A3. In the unloading zone A5, the glass articles 10 may be unloaded from the carrier 110 (step S6-1).

Figure 10:
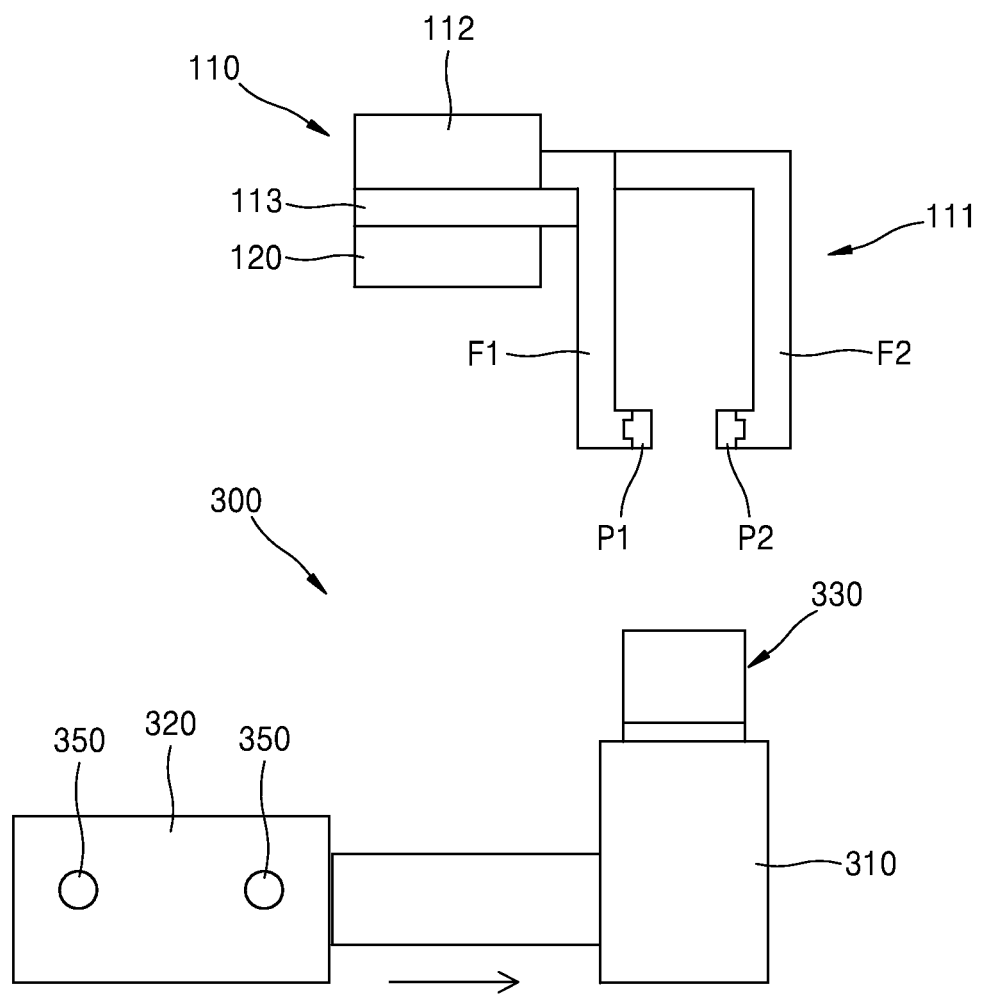
Figure 11A:
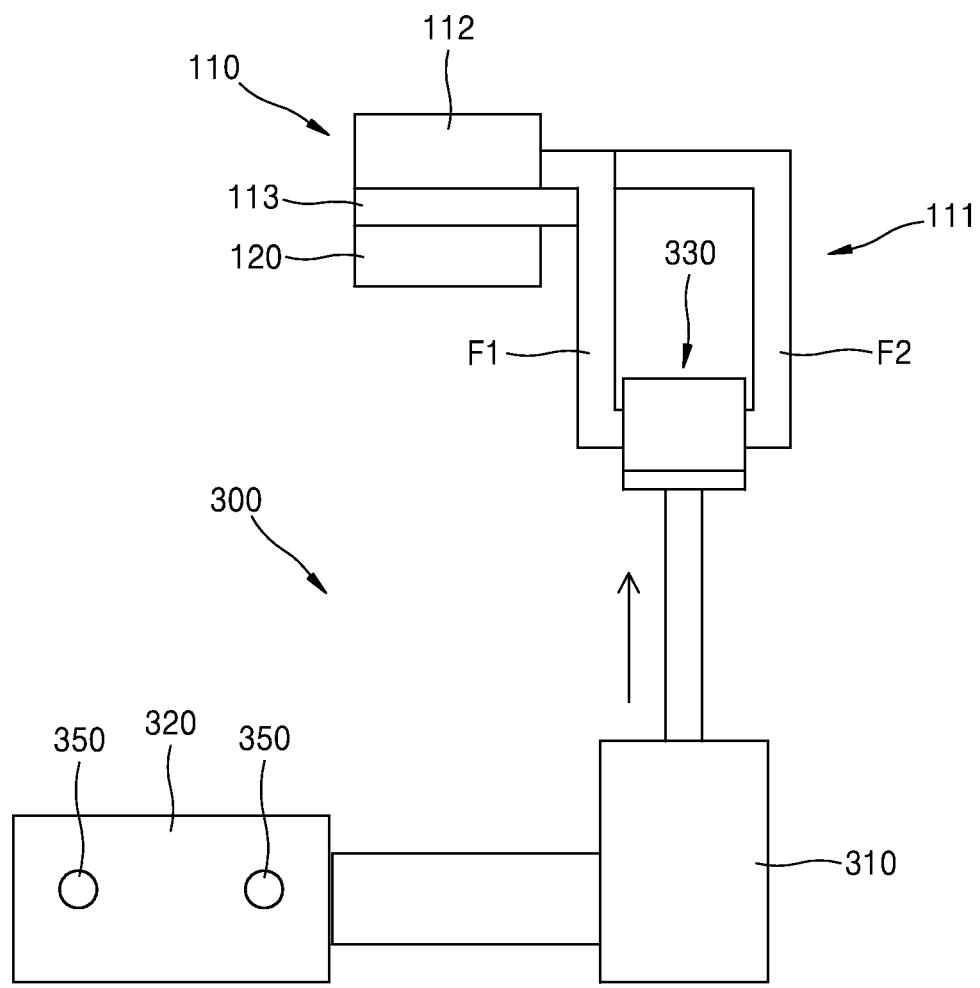
Figure 11B:
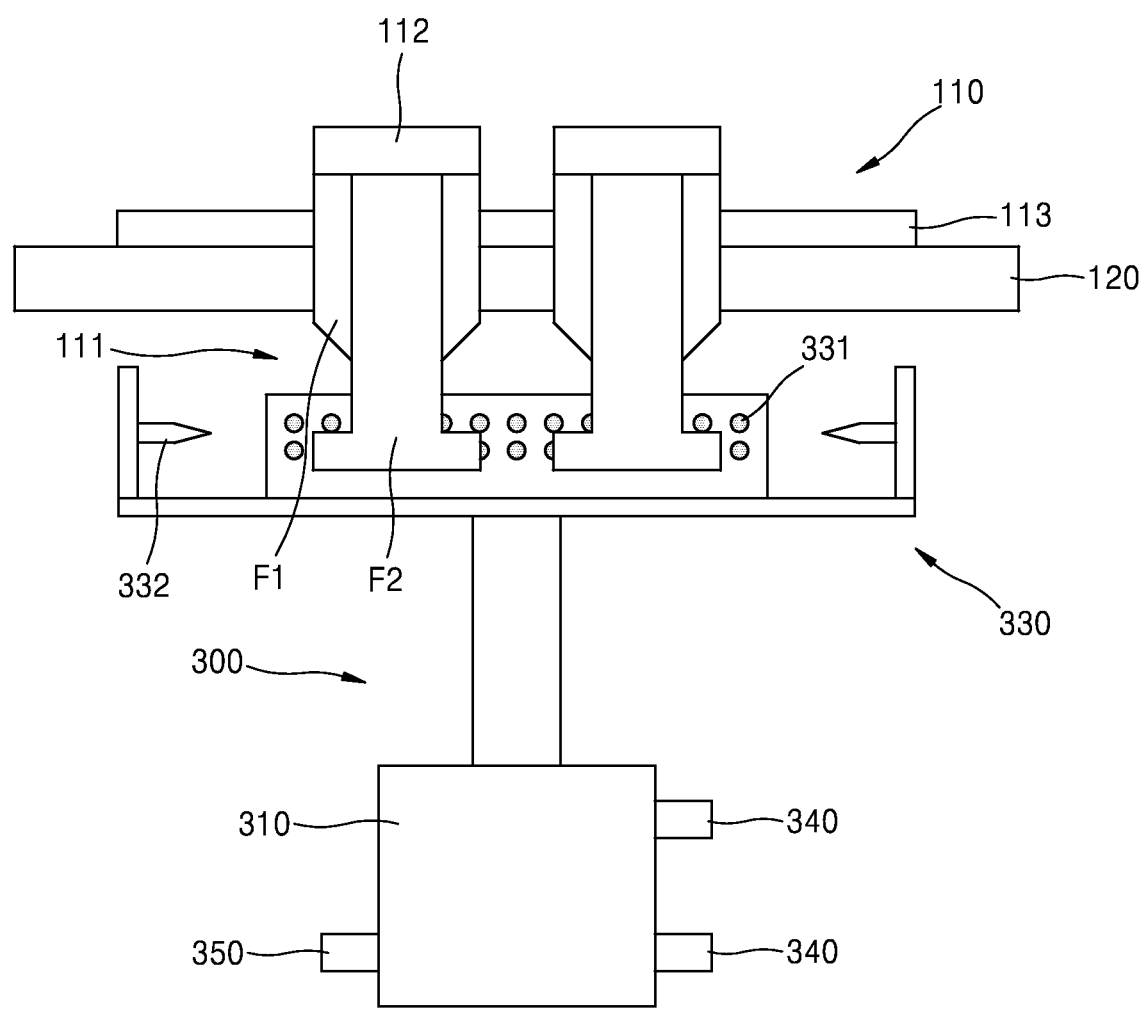

Referring to FIGS. 2, 8, and 10 to 13, when the glass articles 10 are sorted into failed glass articles, the glass articles 10 may be unloaded from carrier 110 in the drop zone A3 (step S6-2). Then, in the drop zone A3, the cleaning apparatus 300 may clean the pair of pads P1 and P2 of the pair of fingers F1 and F2 of the gripper 111 of the carrier 110. When an empty carrier 11 reaches the vicinity of the cleaning apparatus 300, the cleaning head 330 may be moved by the moving unit 310 and/or 320 from a standby position to a working position at which the pair of pads P1 and P2 is cleaned. For example, the cleaning head 330 may be horizontally moved by the second moving unit 320, as shown in FIG. 10, and then may be vertically raised by the first moving unit 310, as shown in FIG. 11.

In some embodiments, during the cleaning (step S7), the cleaning head 330 may be moved finely by the moving unit 310 and/or 320 in the vertical and/or horizontal direction from the working position. In some embodiments, the pair of pads P1 and P2 may be swept with a cleaning head 330 including a brush 331 to clean the pair of pads P1 and P2. Additionally or alternatively, fluid may be injected into the pair of pads P1 and P2 with a cleaning head 330 including a nozzle 332 to clean the pair of pads P1 and P2. The cleaning head 330 may contact the pair of pads P1 and P2 simultaneously to clean the pair of pads P1 and P2. For example, the brush 331 of the cleaning head 330 may contact the pair of pads P1 and P2 simultaneously. However, for example, the nozzle 332 of the cleaning head 330 may not contact the pair of pads P1 and P2.

Figure 12:
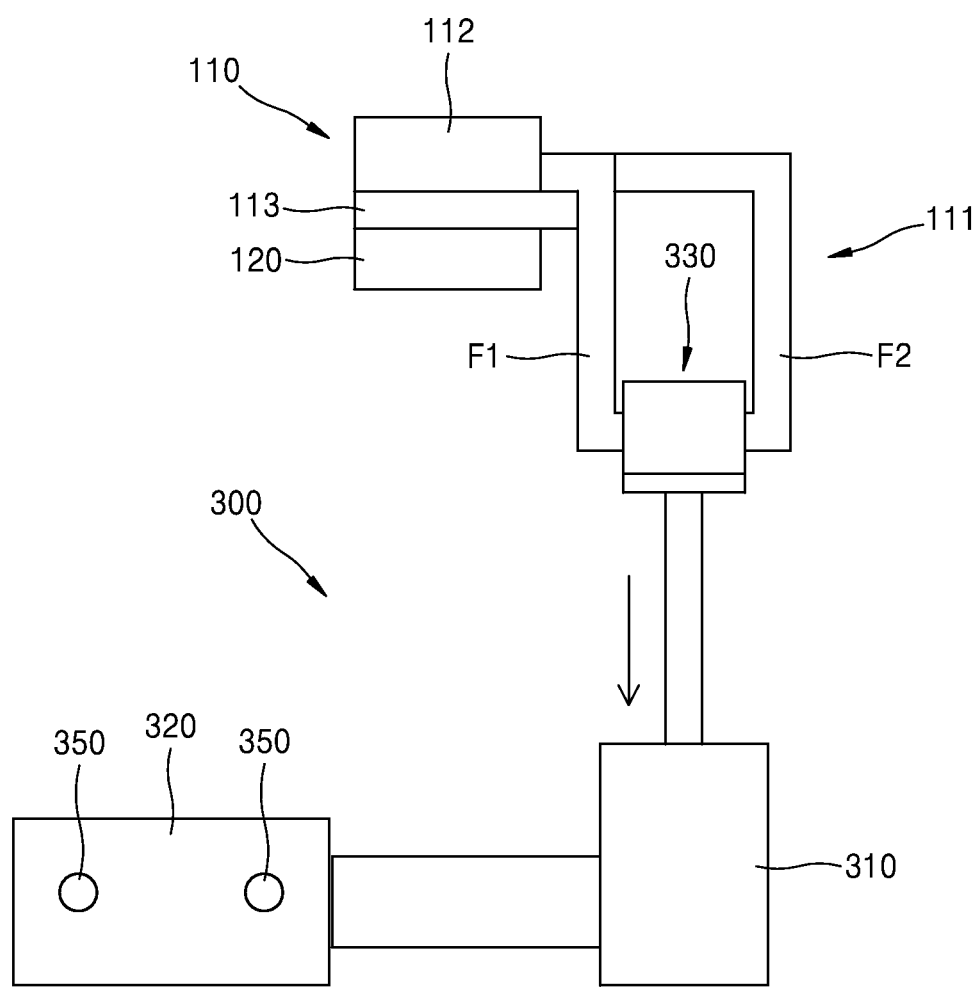

When the cleaning is completed, the cleaning head 330 may be moved back to the standby position by the moving unit 310 and/or 320. For example, as shown in FIG. 12, the cleaning head 330 may be lowered in a direction opposite to the vertical direction by the first moving unit 310. Then, as shown in FIG. 13, the cleaning head 330 may be moved in a direction opposite to the horizontal direction by the second moving unit 320.

In some embodiments, the glass processing method 1B may further include sensing the position of the cleaning head 330. For example, when the position of the cleaning head 330 sensed by the sensors 340 and/or 350 is not the standby position even though the carrier 110 is passing through the drop zone A3 along with the glass articles 10, or when the position of the cleaning head 330 sensed by the sensors 340 and/or 350 is not the working position even though an empty carrier 110 is passing through the drop zone A3, an alarm may be sent to an operator and/or the conveyor 120 may be stopped. Thus, the cleaning head 330 may be prevented from colliding with the glass articles 10, and/or the cleaning head 330 may be prevented from omitting cleaning an empty carrier.

In some embodiments, when the cleaning (step S7) is completed, an empty carrier 110 is conveyed by the conveyor 120 from the drop zone A3 to the loading zone A1 through the processing zone A4, the unloading zone A5, and the return zone A6. In the loading zone A1, the empty carrier 110 is loaded with new glass articles 10.

In some embodiments, unlike that shown in FIG. 2, the cleaning apparatus 300 may be located in the unloading zone A5 or the return zone A6. In this case, after the glass articles 10 are unloaded from the carrier 110 in the unloading zone A5 or the drop zone A3 (step S6-1 or S6-2), the cleaning apparatus 300 may clean the empty carrier 110. That is, the cleaning apparatus 300 may clean all of the carriers 110 passing through the unloading zone A5 or the return zone A6.

The glass processing method 1B according to the present disclosure includes cleaning the pads P1 and P2 of the fingers F1 and F2 of the gripper 111 of the carrier 110 (step S7). Thus, it is possible to prevent debris, particles, and/or dust from falling from the pads P1 and P2 of the fingers F1 and F2 of the gripper 111 of the carrier 110 to the processing equipment 400 and thus contaminating the processing equipment 400. In addition, it is possible to prevent debris, particles, and/or dust remaining on the pads P1 and P2 of the fingers F1 and F2 of the gripper 111 of the carrier 110 from damaging subsequent glass articles loaded to the carrier 110.

While the present disclosure has been particularly shown and described with reference to embodiments thereof, it will be understood that various variations in form and details may be made therein without departing from the spirit and scope of the following claims.

What is claimed is:

1. A glass processing apparatus comprising:
   a glass transportation apparatus comprising a carrier comprising a pair of gripper fingers configured to grip glass articles, and a conveyor configured to convey the carrier in a conveyance direction; and
   a cleaning apparatus comprising a cleaning head configured to translate linearly in a first vertical direction perpendicular to the conveyance direction and away from a standby position to a working position at least partially between the pair of gripper fingers.

2. The glass processing apparatus of claim 1, wherein the cleaning head comprises a brush configured to sweep the pair of gripper fingers.

3. The glass processing apparatus of claim 1, wherein the cleaning head comprises a nozzle configured to inject fluid.

4. The glass processing apparatus of claim 3, wherein the nozzle comprises a first nozzle configured to inject fluid in a first direction along the conveyance direction.

5. The glass processing apparatus of claim 4, wherein the nozzle comprises a second nozzle configured to inject fluid in a second direction opposite the first direction.

6. The glass processing apparatus of claim 1, wherein the cleaning apparatus further comprises a sensor configured to sense a position of the cleaning head.

7. The glass processing apparatus of claim 1, wherein the conveyor forms a loop and the carrier is configured to be circulated by the conveyor along at least a portion of the loop.

8. The glass processing apparatus of claim 1, wherein the cleaning head is configured to simultaneously contact each gripper finger of the pair of gripper fingers in the working position.

9. The glass processing apparatus of claim 8, wherein the cleaning head comprises two sets of brushes extending in opposite brush directions to corresponding free ends, and free ends of a first set of brushes of the two sets of brushes are configured to contact a first gripper finger of the pair of gripper fingers while free ends of a second set of brushes of the two sets of brushes contact a second gripper finger of the pair of gripper fingers while the cleaning head is in the working position.

10. The glass processing apparatus of claim 9, wherein each brush direction of the opposite brush directions are perpendicular to the vertical direction and perpendicular to the conveyance direction.

11. The glass processing apparatus of claim 1, further comprising a vertical moving unit configured to translate the cleaning head in the first vertical direction perpendicular to the conveyance direction and away from the standby position to the working position, and the vertical moving unit is further configured to translate the cleaning head in a second vertical direction opposite the first vertical direction from the working position towards the standby position.

12. The glass processing apparatus of claim 11, further comprising a horizontal moving unit configured to translate the cleaning head in a first horizontal direction perpendicular to the conveyance direction and the first vertical direction, and the horizontal moving unit is further configured to translate the cleaning head in a second horizontal direction opposite the first horizontal direction.

13. The glass processing apparatus of claim 1, wherein the cleaning head is further configured to translate linearly in a first horizontal direction perpendicular to the conveyance direction and the first vertical direction from the standby position to the working position at least partially between the pair of gripper fingers.

14. A method of processing a glass article with the glass processing apparatus of claim 1 comprising:
   loading the glass article to the carrier by picking up the glass article with the pair of gripper fingers such that the pair of gripper fingers contact the glass article;
   conveying the glass article by conveying the carrier with the conveyor;
   unloading the glass article from the carrier by causing the pair of gripper fingers to be detached from the glass article;
   translating the cleaning head linearly in the first vertical direction perpendicular to the conveyance direction and away from the standby position to the working position at least partially between the pair of gripper fingers; and cleaning the pair of gripper fingers with the cleaning head while the cleaning head is in the working position.

15. The glass processing method of claim 14, further comprising translating the cleaning head linearly from the working position to the standby position after cleaning the pair of gripper fingers with the cleaning head.

16. The glass processing method of claim 15, wherein translating the cleaning head linearly from the standby position to the working position comprises translating the cleaning head in a first horizontal direction perpendicular to the conveyance direction and the first vertical direction and then translating the cleaning head in the first vertical direction, and wherein translating the cleaning head linearly from the working position to the standby position comprises translating the cleaning head in a second vertical direction opposite to the first vertical direction and then moving the cleaning head in a second horizontal direction opposite to the first horizontal direction.

17. The glass processing method of claim 14, wherein the cleaning of the pair of gripper fingers comprises simultaneously bringing the cleaning head into contact with the pair of gripper fingers.

18. The glass processing method of claim 14, wherein the cleaning of the pair of gripper fingers comprises sweeping the pair of gripper fingers with the cleaning head including a brush.

19. The glass processing method of claim 14, wherein the cleaning of the pair of gripper fingers comprises injecting fluid with the cleaning head.

20. The glass processing method of claim 14, further comprising sensing a position of the cleaning head.

\* \* \* \* \*